(12) United States Patent
Parikh et al.

(10) Patent No.: US 9,586,584 B2
(45) Date of Patent: Mar. 7, 2017

(54) MODIFYING ADAPTIVE CRUISE CONTROL TO MITIGATE REAR-END COLLISIONS

(71) Applicant: Robert Bosch GmbH, Stuttgart (DE)

(72) Inventors: Sameer J. Parikh, Plymouth, MI (US); Oliver Schwindt, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/911,696

(22) PCT Filed: Sep. 9, 2014

(86) PCT No.: PCT/US2014/054669
§ 371 (c)(1),
(2) Date: Feb. 11, 2016

(87) PCT Pub. No.: WO2015/038501
PCT Pub. Date: Mar. 19, 2015

(65) Prior Publication Data
US 2016/0200318 A1    Jul. 14, 2016

Related U.S. Application Data

(60) Provisional application No. 61/876,403, filed on Sep. 11, 2013.

(51) Int. Cl.
*B60T 7/12* (2006.01)
*B60W 30/14* (2006.01)
(Continued)

(52) U.S. Cl.
CPC .......... *B60W 30/143* (2013.01); *B60W 30/16* (2013.01); *G01S 13/931* (2013.01);
(Continued)

(58) Field of Classification Search
None
See application file for complete search history.

(56) References Cited

U.S. PATENT DOCUMENTS

2016/0207532 A1* 7/2016 Kida ..................... B60W 10/04
2016/0214604 A1* 7/2016 Kida ..................... B60W 50/10

FOREIGN PATENT DOCUMENTS

DE    102012204603    6/2013
EP    1607264    12/2005
(Continued)

OTHER PUBLICATIONS

International Search Report and Written Opinion for Application No. PCT/US2014/054669 dated Dec. 12, 2014 (12 pages).

*Primary Examiner* — Adam Alharbi
(74) *Attorney, Agent, or Firm* — Michael Best & Friedrich LLP

(57) ABSTRACT

Methods and systems for controlling a host vehicle to mitigate rear-end collisions. One method includes automatically maintaining the host vehicle at least a predetermined following distance from a front vehicle traveling ahead of the host vehicle. The method also includes detecting a rear vehicle traveling behind the host vehicle and determining when the rear vehicle poses a rear-end collision risk with the host vehicle. In addition, the method includes automatically, by a controller, increasing a speed of the host vehicle when the rear vehicle poses a rear-end collision risk with the host vehicle, and automatically reducing the predetermined following distance to decrease a distance between the host vehicle and the front vehicle and increase a distance between the host vehicle and the rear vehicle when the rear vehicle poses a rear-end collision risk with the host vehicle.

20 Claims, 4 Drawing Sheets

(51) Int. Cl.
*B60W 30/16* (2012.01)
*G01S 13/93* (2006.01)
*G01S 15/93* (2006.01)

(52) U.S. Cl.
CPC ...... *B60W 2550/308* (2013.01); *G01S 15/931* (2013.01); *G01S 2013/935* (2013.01); *G01S 2013/9321* (2013.01); *G01S 2013/9325* (2013.01); *G01S 2013/9346* (2013.01); *G01S 2013/9353* (2013.01); *G01S 2013/9364* (2013.01); *G01S 2013/9378* (2013.01)

(56) References Cited

FOREIGN PATENT DOCUMENTS

| | | |
|---|---|---|
| EP | 2042399 | 4/2009 |
| EP | 2216197 | 8/2010 |
| JP | 2008080845 | 4/2008 |

\* cited by examiner

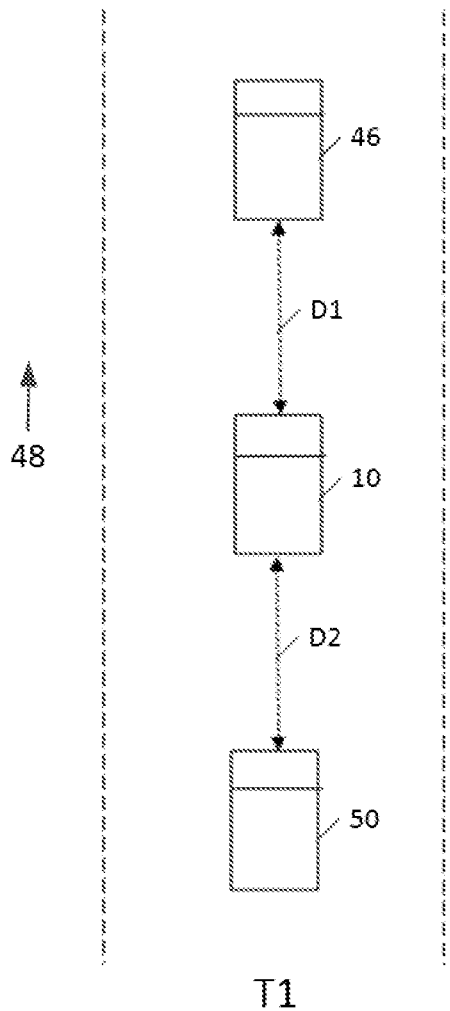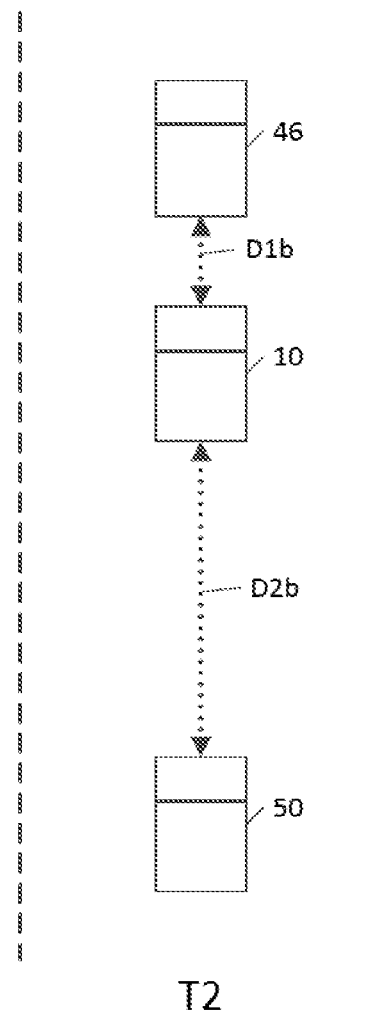
FIG. 3A  FIG. 3B

MODIFYING ADAPTIVE CRUISE CONTROL TO MITIGATE REAR-END COLLISIONS

RELATED APPLICATIONS

This application claim priority to U.S. Provisional Application No. 61/876,403, filed Sep. 11, 2013, the entire content of which is hereby incorporated by reference.

BACKGROUND

Embodiments of the invention relate to methods and systems for mitigating collisions, such as rear vehicle collisions.

SUMMARY

Rear driver assistance systems offer blind spot detection ("BSD"), closing vehicle warning ("CVW"), and/or rear cross traffic alert ("CTA") functionality that use data from rear sensors (e.g., radar sensors). Vehicle can also be equipped with adaptive cruise control ("ACC") and forward collision warning ("FCW") functions that use data from front sensors (e.g., radar sensors). The front and rear sensor systems, however, operate independently.

Accordingly, embodiments of the invention provide systems and methods for avoiding and/or mitigating a rear-end collision by fusing information from front and rear sensors. For example, one embodiment of the invention adjusts a distance between a host vehicle and a front vehicle maintained by the host vehicle's adaptive cruise control When a potential rear-end collision is detected by a rear radar system. Decreasing the distance between the host vehicle and the front vehicle moves the host vehicle further from a following vehicle that poses a potential collision risk to the host vehicle. In particular, due to the adjusted distance, the following vehicle has more distance to brake, which mitigates a collision or the impact of a collision if the following vehicle collides with the host vehicle.

For example, one embodiment of the invention provides a system for controlling a host vehicle. The system includes at least one controller. The at least one controller is configured to automatically maintain the host vehicle at least a predetermined following distance from a front vehicle traveling ahead of the host vehicle. The at least one controller is also configured to obtain data from at least one rearward-facing environment sensor mounted on the host vehicle, detect a rear vehicle traveling behind the host vehicle based on the data, and automatically increase a speed of the host vehicle when the rear vehicle poses a rear-end collision risk with the host vehicle. The at least one controller is further configured to automatically reduce the predetermined following distance to decrease a distance between the host vehicle and the front vehicle and increase a distance between the host vehicle and the rear vehicle when the rear vehicle poses a rear-end collision risk with the host vehicle.

Another embodiment of the invention provides a method of controlling a host vehicle. The method includes automatically maintaining the host vehicle at least a predetermined following distance from a front vehicle traveling ahead of the host vehicle. The method also includes detecting a rear vehicle traveling behind the host vehicle, determining when the rear vehicle poses a rear-end collision risk with the host vehicle, and automatically, by a controller, increasing a speed of the host vehicle when the rear vehicle poses a rear-end collision risk with the host vehicle. The method further includes automatically reducing the predetermined following distance to decrease a distance between the host vehicle and the front vehicle and increase a distance between the host vehicle and the rear vehicle when the rear vehicle poses a rear-end collision risk with the host vehicle.

Other aspects of the invention will become apparent by consideration of the detailed description and accompany drawings.

BRIEF DESCRIPTION OF THE DRAWINGS

FIG. 3A illustrates an exemplary scenario of a vehicle of FIG. 1 traveling behind a front vehicle and ahead of a rear vehicle.

FIG. 3B illustrates an exemplary of scenario of the vehicle of FIG. 1 mitigating a collision risk with the rear vehicle.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being, carried out in various ways. Also, the methods, operations, and sequences described herein can be performed in various orders. Therefore, unless otherwise indicated herein, no required order is to be implied from the order in which elements, steps, or limitations are presented in the detailed description or claims of the present application. Also unless otherwise indicated herein, the method and process steps described herein can be combined into fewer steps or separated into additional steps.

In addition, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted" "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

Figure 1:
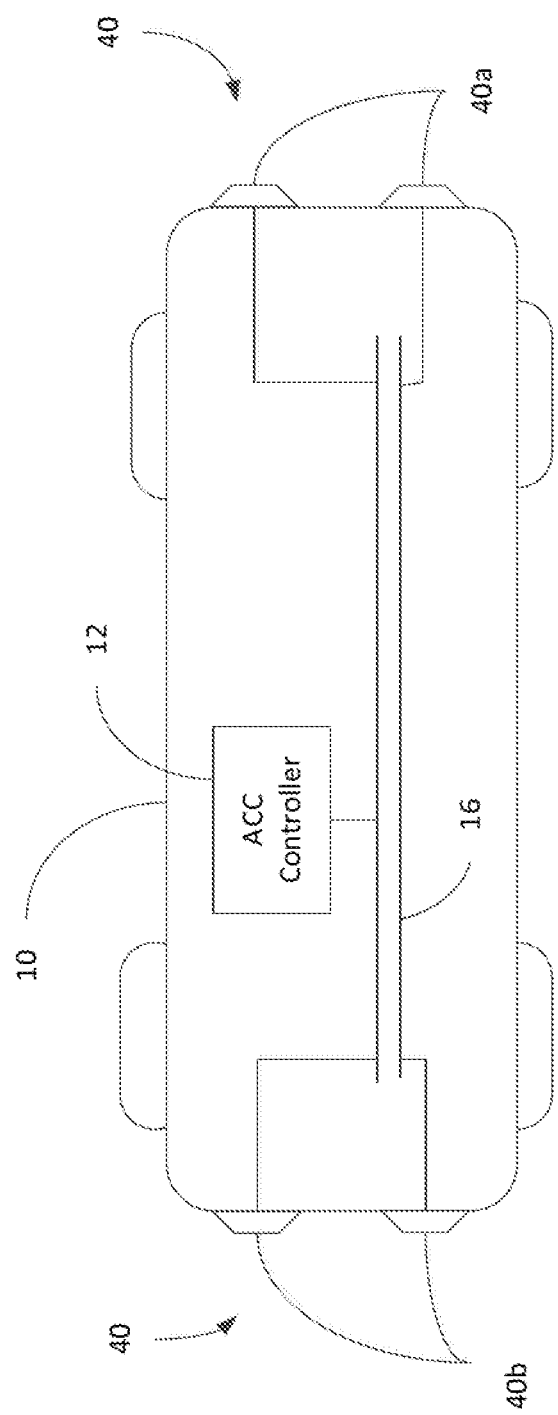
FIG. 1 schematically illustrates a vehicle including an adaptive cruise control controller.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "controllers" described in the specification can include one of more processors, one or more non-transitory computer-readable medium modules, one or more input/output interfaces, and various connections (e.g., a system bus) connecting the components FIG. 1 illustrates a vehicle 10. The vehicle 10 includes an adaptive cruise control ("ACC") controller 12. The controller 12 can be connected to a network included in the vehicle 10, such as a controller area network ("CAN") bus 16, that allows the controller 12 to exchange data with other components included in the vehicle 10.

Figure 2:
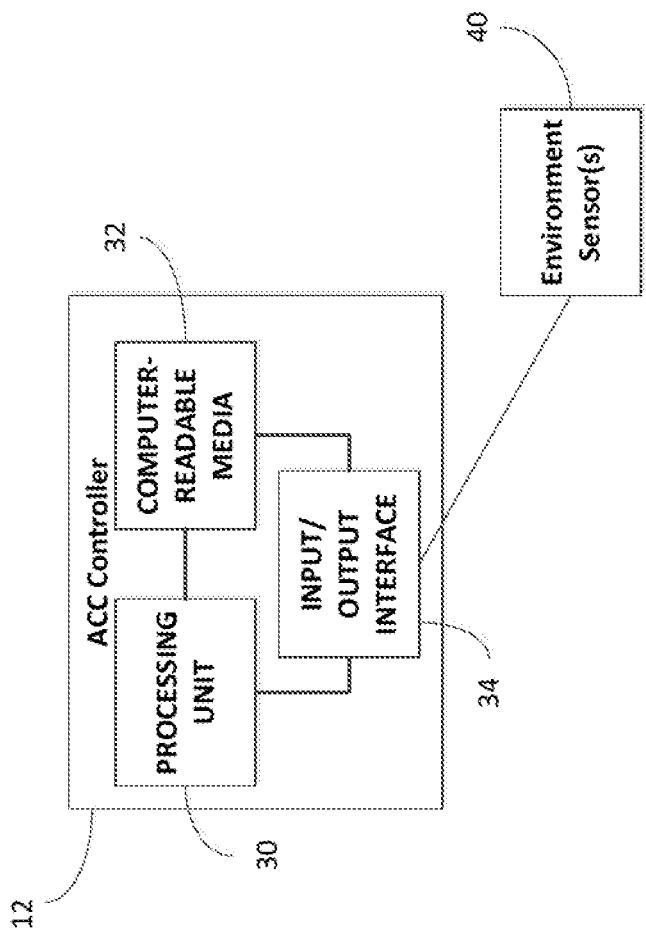
FIG. 2 schematically illustrates the adaptive cruise control controller of FIG. 1.

As illustrated in FIG. 2, the controller 12 includes a processing unit 30 (e.g., a microprocessor, application specific integrated circuit, etc.), non-transitory computer-readable media 32, and an input/output interface 34. The computer-readable media 32 can include random access memory ("RAM") and/or read-only memory ("ROM"). The input/output interface 34 transmits and receives data from devices external to the controller 12 (e.g., over the bus 16 and/or over direct (e.g., wired) connections). For example, as illustrated in FIG. 1, the controller 12 can be configured to obtain data from one or more environment sensors 40 mounted on the vehicle 10 through the input/output interface 34 (e.g., over the bus 16 and/or over a direct connection). The environment sensors 40 detect conditions regarding an environment around the vehicle 10. The environment sensors 40 can include cameras (e.g., still or video), radar sensors, ultrasonic sensors, etc.

For example, in the embodiment illustrated in FIG. 1, the environment sensors 40 include one or more forward-facing sensor 40a, such as one or more radar sensors. As described in more detail below, the controller 12 uses data collected by the sensors 40a to maintain the vehicle 10 at a user-selected cruising speed while maintaining a predetermined distance (e.g., default or user-specified) between the vehicle 10 (i.e., the host vehicle) and a target or front vehicle 46 located ahead of the vehicle 10 (see FIG. 3A, arrow 48 representing a direction of travel of the vehicles 10 and 46).

As illustrated in FIG. 1, the controller 12 also receives data from one or more rearward-facing environment sensors 40b, such as one or more radar sensors. As described in more detail below, the controller 12 uses the data from the rearward-facing sensors 40b to detect potential rear-end collisions between the vehicle 10 and a rear vehicle 50 traveling behind the vehicle 10 (see FIG. 3A) and automatically adjust a distance between the host vehicle 10 and the rear vehicle 50 to mitigate the risk of collision or collision impact.

Returning to FIG. 2, the processing unit 30 included in the controller 12 receives data (e.g., from the media 32 and/or the input/output interface 34) and processes the data by executing one or more instructions or modules. The instructions or modules are stored in the computer-readable media 32. The processing unit 30 also stores data (e.g., data received from the bus 16 or data generated by instructions or modules executed by the processing unit 30) to the media 32. It should be understood that although only a single processing unit, input/output interface, and computer-readable media module are illustrated in FIG. 2, the controller 12 can include multiple processing units, memory modules, and/or input/output interfaces. It should also be understood that the functionality performed by the controller 12 as described in the present application can be distributed over multiple controllers included in the vehicle 10, and the controller 12 can be configured to perform additional functionality not described in the present application.

Figure 4A:
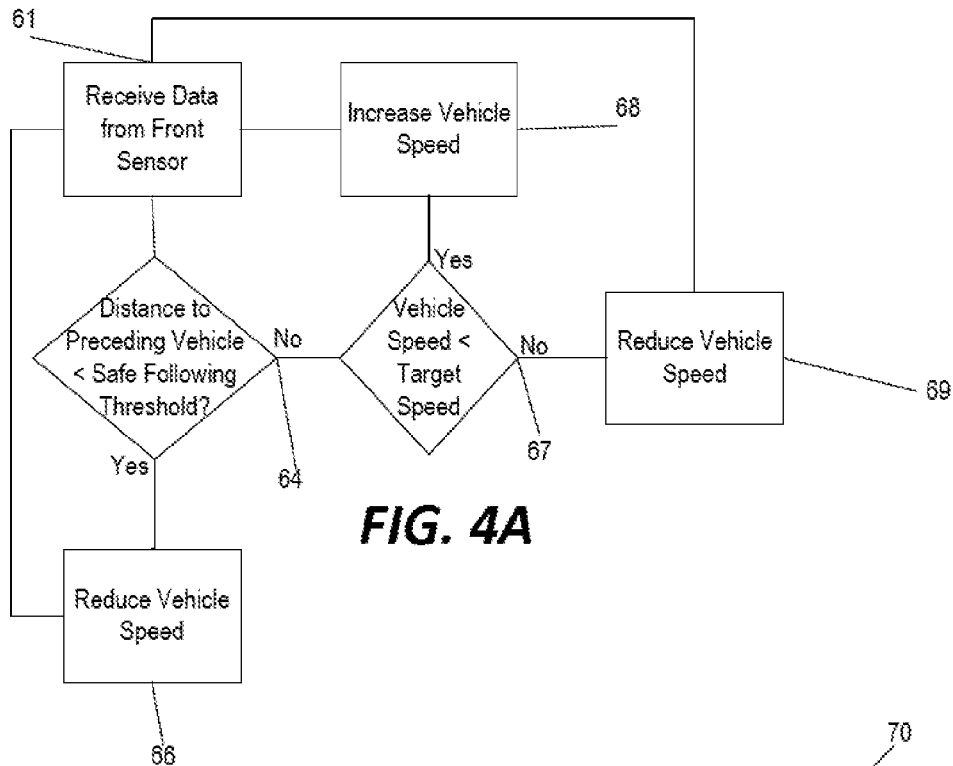
FIG. 4A is a flowchart of a method of operating the vehicle of FIG. 1 with an adaptive cruise control mechanism.

The instructions stored in the computer-readable media 32 provide particular functionality when executed by the processing unit 30. In general, the instructions, when executed by the processing unit 30, perform the method illustrated in FIGS. 4A and 4B. As illustrated in FIG. 4A, this method includes maintaining the vehicle 10 at a user-selected cruising speed. For example, the controller 12 can communicate with an engine controller and/or brake controller included in the vehicle 10 to regulate the speed of the vehicle 10 to the user-selected cruising speed. The controller 12 obtains data from one or more forward-facing environment sensors 40a (at block 61). The controller 12 uses the data from the sensors 40a to determine a distance between the host vehicle 10 and a front vehicle 46 (if present) and compares the determined distance to a predetermined following distance (at block 64). As noted above, the predetermined following distance may be a default distance or a user-selected distance.

If the determined distance is less than the predetermined following distance (at block 64), the controller 12 reduces the speed of the vehicle 10 (i.e., to a speed less than the user-specified cruising speed) to keep the vehicle 10 from getting closer to the front vehicle 46 than the predetermined following distance (at block 66). However, if there is no front vehicle 46 or if the distance between the host vehicle 10 and the front vehicle 46 is greater than the predetermined safe following distance, then the controller 12 adjusts the speed of the vehicle according to the user-specified cruising speed. If the current vehicle speed is less than the user-specified cruising speed (i.e., a target speed) (at block 67), then the controller 12 increases the speed of the host vehicle 10 (at block 68). In contrast, if the current vehicle speed is greater than the target speed, then the controller 12 reduces the speed of the host vehicle 10 (at block 69).

As a result, when the controller 12 reduces the speed of the vehicle 10 to keep the vehicle 10 at least the predetermined following distance from the front vehicle 46, the controller 12 generally does not return the vehicle 10 to the user-selected cruising speed until the vehicle 10 can maintain such a speed without violating the predetermined following distance. Also, in some embodiments controller 12 cancels cruise control when the vehicle 10 violates the predetermined following distance and wait for the driver to re-establish a cruising speed. It should also be understood that the controller 12 can be configured to detect other conditions of the vehicle 10 and/or the front vehicle 46 to determine whether to adjust the speed of the vehicle 10. These conditions can include but are not limited to a speed of the host vehicle 10, an acceleration of the host vehicle 10, a speed of the front vehicle 46, and an acceleration of the front vehicle 46.

Figure 4B:
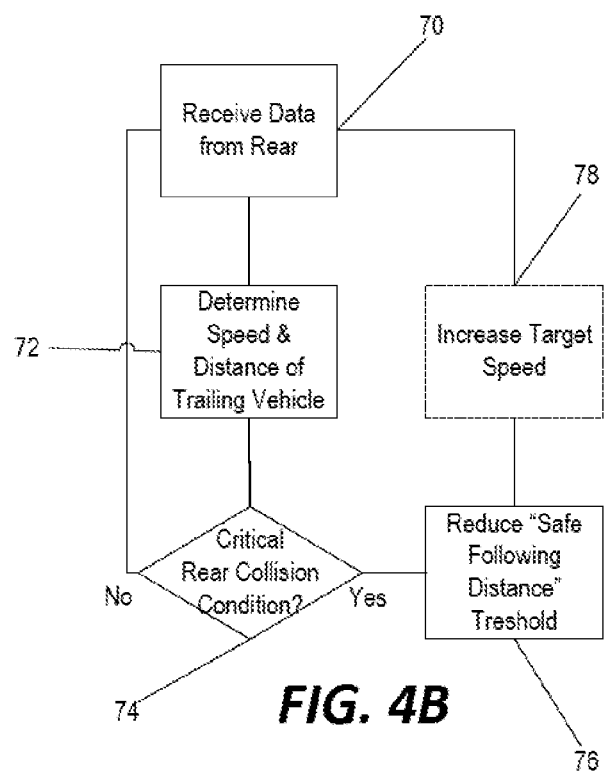
FIG. 4B is a flowchart of a method of mitigating rear-end collisions that is executed concurrently with the method of FIG. 4A.

Accordingly, in the method of FIG. 4A, the controller 12 performs adaptive cruise control to maintain the vehicle 10 at a user-specified cruising speed while preventing the vehicle 10 from committing a rear-end collision with a front vehicle 46. However, there is also a risk that the vehicle 10 may be involved in a rear-end collision with a vehicle approaching from the rear. Studies have shown that such rear-end collisions account for a significant number of traffic accidents. Accordingly, the controller 12 modifies the adaptive cruise control to mitigate rear-end collisions between the host vehicle 10 and a rear vehicle 50 traveling behind the host vehicle 10. As illustrated in FIG. 4B, illustrate on example of a method that is executed by the controller 12 concurrently with the method of FIG. 4A to modify the operation of the adaptive cruise control to mitigate such rear-end collisions.

According to the method of FIG. 4B, the controller 12 obtains data from one or more rearward-facing environment sensors 40b (at block 70). The controller 12 uses the data from the sensors 40b to determine a position of a rear vehicle 50 (if present) and, optionally, a speed of the rear vehicle 50 (at block 72). The controller 12 then determines whether the rear vehicle 50 poses a rear-end collision risk for the host vehicle 10 (at block 74). The controller 12 can make this determination by comparing a distance between the host vehicle 10 and the rear vehicle 50 to a predetermined distance, by comparing a speed and/or acceleration of the rear vehicle 50 to a speed and/or acceleration of the host vehicle (e.g., does the speed and/or acceleration of the rear vehicle 50 exceed the speed and/or acceleration of the host vehicle 10), and/or by determining whether, based on the rear vehicle's current speed and/or distance from the host vehicle 10, the rear vehicle 50 could brake in time to avoid a collision with the host vehicle 10 (e.g., if host vehicle 10 continues operating at its current speed or if the host vehicle needed to stop). If the controller 12 determines that the detected rear vehicle 50 poses a potential rear-end collision risk, the controller 12 automatically increases a speed of the host vehicle 10 to increase a distance between the host vehicle 10 and the detected rear vehicle 50 (at block 78).

If the speed of the host vehicle 10 is currently limited by the presence of a front vehicle 46 operating in front of the host vehicle 10, the controller 12 increases the speed of the host vehicle (at least in part) by reducing the predetermined following distance to a second safe following distance (at block 76). This reduction allows the speed of the host vehicle 10 to increase (at block 78), which consequently reduces the distance between the host vehicle 10 and the front vehicle 46. For example, in some embodiments, the controller 12 reduces the predetermined following distance to a predetermined minimum safe following distance.

In some embodiments, when the controller 12 detects a critical rear-collision condition, the controller 12 increases the speed of the host vehicle 10 up to the user-specified cruising speed (until the distance between the host vehicle 10 and the front vehicle 46 reaches the second, reduced safe following distance). However, in other embodiments, when the controller 12 detects a critical rear-collision condition, the controller 12 increases the speed of the host vehicle 10 as needed to avoid a rear collision with the rear vehicle 50—even if such an increased speed exceeds the user-specified cruising speed. The controller 12 can also apply a maximum speed threshold when increasing the speed of the vehicle 10 to maintain driver comfort. Furthermore, by increasing the speed above the user-specified cruising speed, the controller 12 can provide mitigation of rear collisions between the rear vehicle 50 and the host vehicle 10 even if a front vehicle 46 is not present in front of the host vehicle. In such cases, the controller 12 increases the speed of the host vehicle 10 and is not influenced or limited by the "safe following distance" with the front vehicle 46.

With the predetermined following distance reduced and the speed of the host vehicle 10 consequently increased, the host vehicle 10 moves closer to the front vehicle 46 and further from the rear vehicle 50. This increased distance between the host vehicle 10 and the rear vehicle 50 provides the rear vehicle 50 with more distance to brake should such a situation occur, which mitigates a collision risk or a collision impact with the host vehicle 10.

FIGS. 3A and 3B provide a specific example of the operation of the controller 12 in mitigating a rear collision with rear vehicle 50. FIG. 3A shows a traffic situation at a first time T1. The host vehicle 10 is maintaining the predetermined following distance D1 with the front vehicle 46. A rear vehicle 50 is approaching the host vehicle 10 from behind and is currently operating at a distance D2 behind the host vehicle 10. As discussed above, the controller 12 receives data from the rearward-facing sensors 40b and calculates whether the rear vehicle 50 is braking of is still able to brake in time to avoid a collision with the host vehicle 10 (see, e.g., distance D2 in FIG. 3).

If the controller 12 determines that the rear vehicle 50 is approaching in a critical manner (e.g., is traveling at a speed and/or acceleration exceeding the host vehicle's speed and/or acceleration by a predetermined amount or percentage, is within a predetermined distance from the host vehicle 10, etc.), the controller 12 increases the speed of the host vehicle 10 and decreases the distance between the host vehicle 10 and the front vehicle 46 to a minimally acceptable distance.

FIG. 3B shows the same traffic situation at a later time T2 after the rear collision mitigation has been implemented. The host vehicle 10 has increased its speed such that it is now operating at a reduced following distance D1b behind the front vehicle 46. This decrease in the following distance between the vehicle 10 and a front vehicle 46 consequently increases the distance between the host vehicle 10 and the rear vehicle 50 (distance D2 increases to distance D2b). This increased distance between the host vehicle 10 and the rear vehicle 50 gives the rear vehicle 50 additional time to brake or steer away and avoid a collision with the host vehicle 10.

In addition to or as an alternative to adjusting a speed of the host vehicle 10 (e.g., to decrease a distance between the host vehicle 10 and the front vehicle 46), the controller 12 can automatically adjust other operations of the host vehicle 10 to prepare and/or protect the vehicle 10 for potential collisions. For example, the controller 12 can command a prefill of the brakes of the host vehicle 10 (e.g., pre-filling the brake lines with a minimum amount of brake pressure to place brake pads on brake disks). Accordingly, based on the pre-fill, if the driver of the host vehicle 10 applies the brakes (e.g., after a collision with the rear vehicle 50 and/or if the front vehicle 46 brakes), the brakes react quickly to prevent the host vehicle 10 from colliding with the front vehicle 46. Similarly, the controller 12 can be configured to automatically turn on one or more external lights of the vehicle 10 (e.g., hazard lights) to provide a warning to the front vehicle 46 and/or the rear vehicle 50 of a detected collision risk. The warning can entice the driver of the front vehicle 46 to speed up and/or entice the driver of the rear vehicle 50 to slow down, both of which can help mitigate collision risks.

The controller 12, in some constructions, can be configured to issue a warning to the driver of the host vehicle 10 before adjusted ACC functionality is applied (e.g., increasing a distance between host vehicle 10 and rear vehicle 50, pre-filling brakes, turning on hazard lights etc.) or during the application of such adjusted functionality. Such warnings can be issued in the form of lighted visual icons, played audible chimes or tones, and/or haptic feedback (e.g., steering wheel vibration) to make the driver aware of the situation.

Accordingly, systems and methods of the present invention avoid and/or mitigate rear-end collisions by modifying operation of a vehicle operating under adaptive cruise control (or further developments like traffic jam assists or autonomous driving) based on a fusion of data from frontward-facing sensors and rearward-facing sensors. In some embodiments, the rearward-facing sensors are used with other vehicle control systems, such as blind spot detection ("BSD") systems and/or closing vehicle warning ("CVW") systems. Therefore, the ACC controller 12 can use existing sensors on a vehicle to perform the functionality described herein, which reduces the cost and complexity of the functionality. Also, in some embodiments, the ACC controller 12 obtains data from the rearward-facing sensors 40*b* indirectly through other vehicle control systems that use data from the sensors 40*b*. For example, the ACC controller 12 can obtain data from a BSD system and/or a CVW system (e.g., over the bus 16) that indicates whether a rear vehicle 50 has been detected and other data regarding a rear vehicle 50 (e.g., position, speed, distance, potential collision risk, etc.).

It should be understood that the functionality described in the present application can be performed by the controller 12 and/or distributed among the controller 12 and other vehicle control systems. For example, in some embodiments, the controller 12 obtains data regarding objects detected around a vehicle (e.g., from rear radar sensors) and issues commands for controlling host vehicle speed and/or ACC following distances accordingly. A separate controller (e.g., an engine controller) can then apply the command to increase the speed of the host vehicle 10. In other embodiments, the controller 12 can be configured to determine when adjusted ACC functionality is needed and issue a flag or message. A separate controller (e.g., a separate ACC controller) can be configured to read the flag and switch ACC functionality to an adjusted version (e.g., applying a minimum following distance and, optionally, ignoring a user-specified cruising speed).

Various features and advantages of the invention are set forth in the following claims.

What is claimed is:

1. A system for controlling a host vehicle, the system comprising:
    at least one controller configured to:
        adjust a speed of the host vehicle to maintain at least a predetermined following
    distance between the host vehicle and a front vehicle traveling ahead of the host vehicle,
        receive data from at least one rearward-facing environment sensor mounted on the host vehicle,
        determine, based on the data from the at least one rearward-facing environment sensor, whether a rear vehicle is traveling behind the host vehicle,
        detect, based on the data from the at least one rearward-facing environment sensor, a critical rear-collision risk,
        reduce the predetermined following distance to a second minimum following distance when the critical rear-collision condition is detected, and
        automatically increase the speed of the host vehicle to maintain the second minimum following distance between the host vehicle and the vehicle tranveling ahead of the host vehicle when the critical rear-collision condition is detected.

2. The system of claim 1, wherein the at least one controller is further configured to automatically pre-fill brakes of the host vehicle when the rear vehicle poses a rear-end collision risk with the host vehicle.

3. The system of claim 1, wherein the at least one controller is further configured to automatically turn on at least one external light on the host vehicle when the rear vehicle poses a rear-end collision risk with the host vehicle.

4. The system of claim 1, wherein the at least one controller is further configured to issue a warning to a driver of the host vehicle when automatically increasing the speed of the host vehicle.

5. The system of claim 1, wherein the at least one controller is further configured to control the speed of the host vehicle to maintain the host vehicle at a user-selected cruising speed.

6. The system of claim 5, wherein the at least one controller is configured to automatically increase the speed of the host vehicle when the critical rear-collision condition is detected by increasing the speed of the host vehicle up to the user-selected cruising speed.

7. The system of claim 5, wherein the at least one controller is configured to automatically increase the speed of the host vehicle when the critical rear-collision condition is detected by increasing the speed of the host vehicle to exceed the user-selected cruising speed.

8. The system of claim 1, wherein the at least one controller is configured to obtain the data from the at least one rearward-facing environment sensor mounted on the host vehicle through a blind spot detection system.

9. The system of claim 1, wherein the at least one controller is configured to obtain the data from the at least one rearward-facing environment sensor mounted on the host vehicle through a closing vehicle warning system.

10. The system of claim 1, wherein the controller is configured to detect a critical rear-collision risk by determining whether the rear vehicle will likely be able to brake in time to avoid a rear end collision with the host vehicle based on a speed of the rear vehicle relative to the host vehicle and a distance between the rear vehicle and the host vehicle as indicated by the data from the at least one rearward-facing environment sensor.

11. A method of controlling a host vehicle, the method comprising:
    automatically maintaining the host vehicle at least a predetermined following distance from a front vehicle traveling ahead of the host vehicle:
    detecting a rear vehicle traveling behind the host vehicle,
    determining when the rear vehicle poses a rear-end collision risk with the host vehicle,
    automatically, by a controller, increasing a speed of the host vehicle when the rear vehicle poses a rear-end collision risk with the host vehicle, and
    automatically reducing the predetermined following distance to decrease a distance between the host vehicle and the front vehicle and increase a distance between the host vehicle and the rear vehicle when the rear vehicle poses a rear-end collision risk with the host vehicle.

12. The method of claim 11, wherein determining when the rear vehicle poses a rear-end collision risk with the host vehicle includes determining the distance between the host vehicle and the rear vehicle and comparing the distance to a predetermined distance.

13. The method of claim 11, wherein determining when the rear vehicle poses a rear-end collision risk with the host vehicle includes determining the speed of the host vehicle, determining a speed of the rear vehicle, and comparing the speed of the host vehicle to the speed of the rear vehicle.

14. The method of claim 11, wherein determining when the rear vehicle poses a rear-end collision risk with the host vehicle includes determining a speed of the rear vehicle, determining the distance between the host vehicle and the rear vehicle, and determining if the rear vehicle has sufficient distance to brake while avoiding a collision with the host vehicle based on the speed of the rear vehicle and the distance between the host vehicle and the rear vehicle.

15. The method of claim 11, further comprising automatically pre-filling brakes of the host vehicle when the rear vehicle poses a rear-end collision risk with the host vehicle.

16. The method of claim 11, further comprising automatically turning on at least one external light on the host vehicle when the rear vehicle poses a rear-end collision risk with the host vehicle.

17. The method of claim 11, further comprising issuing a warning to a driver of the host vehicle when automatically increasing the speed of the host vehicle.

18. The method of claim 11, further comprising controlling the speed of the host vehicle to maintain the host vehicle at a user-selected cruising speed.

19. The method of claim 18, wherein automatically increasing the speed of the host vehicle when the rear vehicle poses a rear-end collision risk with the host vehicle includes increasing the speed of the host vehicle up to the user-selected cruising speed.

20. The method of claim 18, wherein automatically increasing the speed of the host vehicle when the rear vehicle poses a rear-end collision risk with the host vehicle includes increasing the speed of the host vehicle to exceed the user-selected cruising speed.

* * * * *